(12) United States Patent
Annigeri et al.

(10) Patent No.: US 8,438,850 B2
(45) Date of Patent: May 14, 2013

(54) WASTE HEAT UTILIZATION FOR PRE-HEATING FUEL

(75) Inventors: Ravindra Annigeri, Roswell, GA (US); David Lee Rogers, Marietta, GA (US); Douglas Rush, Greenville, SC (US); Kevin J. Gersch, Marietta, GA (US)

(73) Assignee: General Electric Company, Schenectady, NY (US)

( * ) Notice: Subject to any disclaimer, the term of this patent is extended or adjusted under 35 U.S.C. 154(b) by 707 days.

(21) Appl. No.: 12/372,127

(22) Filed: Feb. 17, 2009

(65) Prior Publication Data

US 2010/0205977 A1    Aug. 19, 2010

(51) Int. Cl.
*F02C 7/224* (2006.01)
*F01D 25/12* (2006.01)

(52) U.S. Cl.
USPC ............. 60/736; 60/39.83; 60/39.3; 60/39.08

(58) Field of Classification Search .................... 60/736, 60/39.08, 776, 39.83, 39.3, 775
See application file for complete search history.

(56) References Cited

U.S. PATENT DOCUMENTS

| | | | |
|---|---|---|---|
| 2,925,712 A * | 2/1960 | Johnson et al. ................. | 60/785 |
| 3,147,823 A * | 9/1964 | Killackey et al. ................. | 184/6 |
| 4,104,873 A * | 8/1978 | Coffinberry ............... | 60/39.281 |
| 4,471,211 A | 9/1984 | Reiss et al. | |
| 4,498,524 A | 2/1985 | Jacobsen | |
| 4,696,156 A * | 9/1987 | Burr et al. ..................... | 60/39.08 |
| 4,773,212 A * | 9/1988 | Griffin et al. .................... | 60/772 |
| 4,991,644 A | 2/1991 | Miaoulis et al. | |
| 5,363,641 A * | 11/1994 | Dixon et al. ..................... | 60/778 |
| 5,615,547 A * | 4/1997 | Beutin et al. ................. | 60/39.08 |
| 5,794,448 A | 8/1998 | Fujioka et al. | |
| 6,324,849 B1 | 12/2001 | Togawa et al. | |
| 6,389,794 B2 * | 5/2002 | Ranasinghe et al. ............ | 60/775 |
| 6,560,966 B1 * | 5/2003 | Fetescu et al. .................. | 60/775 |
| 7,509,793 B2 * | 3/2009 | Tumelty et al. .............. | 60/39.08 |
| 7,984,606 B2 * | 7/2011 | Smith .............................. | 60/266 |
| 2005/0039433 A1 * | 2/2005 | Nakano et al. ............... | 60/39.08 |

FOREIGN PATENT DOCUMENTS

EP        1505278 A2 *   2/2005

* cited by examiner

*Primary Examiner* — William H Rodriguez
*Assistant Examiner* — Carlos A Rivera
(74) *Attorney, Agent, or Firm* — Cooper Legal Group, LLC

(57) ABSTRACT

A waste heat utilization system and associated methods for preheating fuel for a turbine engine component. The turbine engine component includes at least one heat generating source. The system includes structure for applying heat from the at least one heat generating source to relatively cold fuel for the turbine engine component to preheat the fuel prior to ignition.

12 Claims, 4 Drawing Sheets

WASTE HEAT UTILIZATION FOR PRE-HEATING FUEL

BACKGROUND OF THE INVENTION

1. Field of the Invention

This invention relates to process and apparatus for preheating fuel for a turbine engine during a generator, and more particularly to extracting heat from lubricating oil for the bearing of the turbine and the generator and applying that heat to relatively cool incoming fuel for the turbine to preheat the fuel.

2. Background of the Invention

In recent years, pipeline natural gas fuel prices have continued to increase dramatically forcing heavy duty combustion turbine power plants to explore cost effective methods for combating rising fuel cost. As the need for higher thermal efficiency in power plants increases, a growing number of combined-cycle power plants are incorporating gas fuel heating as a means for improving overall efficiency. A gas fuel heater can be used to preheat fuel prior to combustion in a gas turbine. Gas fuel heating can reduce the amount of fuel required for achieving a specific firing temperature and thereby improves heat rate.

Gas fuel pre-heating is also required from a dew point consideration. A superheat requirement is determined to ensure that gas is free of liquids and particularly, hydrocarbon droplets, during gas fuel operation. The superheat is a temperature difference between the supply and respective dew point temperature of the gas fuel. Dew point heaters are used to add the desired amount of superheat. Simple cycle power plants typically employ gas fired, oil-fired or electric heaters for fuel heating and combined cycle power plants can use feed water extracted from the heat recovery steam generator (HRSG) at an optimum location.

In existing turbine power plants, heat is generated in the seal oil, turbine turning gear, gas turbine bearings, generator bearings and in the generator cooling water. Currently, the waste heat from gas turbine lubrication, generator and auxiliary system is rejected to the atmosphere via the plant auxiliary cooling water. There is a need to capture some of this waste heat for heating turbine fuel. This waste heat extraction will increase efficiency, reduce heat losses, increase fuel utilization, and lower operating costs for the combustion turbine power plants.

BRIEF SUMMARY OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

In accordance with one aspect the present invention provides a waste heat utilization system for preheating fuel for a turbine engine component. The component includes at least one heat generating source. The system includes means for applying heat from the at least one heat generating source to relatively cold fuel for the turbine engine to preheat the fuel prior to ignition.

In accordance with another aspect the present invention provides a waste heat utilization method for preheating fuel for a turbine engine component including extracting heat from at least one heat generating source in the turbine engine component and applying the heat to relatively cold fuel for the turbine engine component to preheat the fuel prior to ignition.

In accordance with yet another aspect the present invention provides a method of providing a waste heat utilization system for preheating fuel for a turbine engine that powers a generator. The turbine engine and/or the generator include at least one heat generating source. The method includes providing means for applying heat from the at least one heat generating source to relatively cold fuel for the turbine engine to preheat the fuel prior to ignition.

BRIEF DESCRIPTION OF THE DRAWING

The foregoing and other aspects of the present invention will become apparent to those skilled in the art to which the present invention relates upon reading the following description with reference to the accompanying drawings, in which.

DETAILED DESCRIPTION OF THE INVENTION

Figure 1:
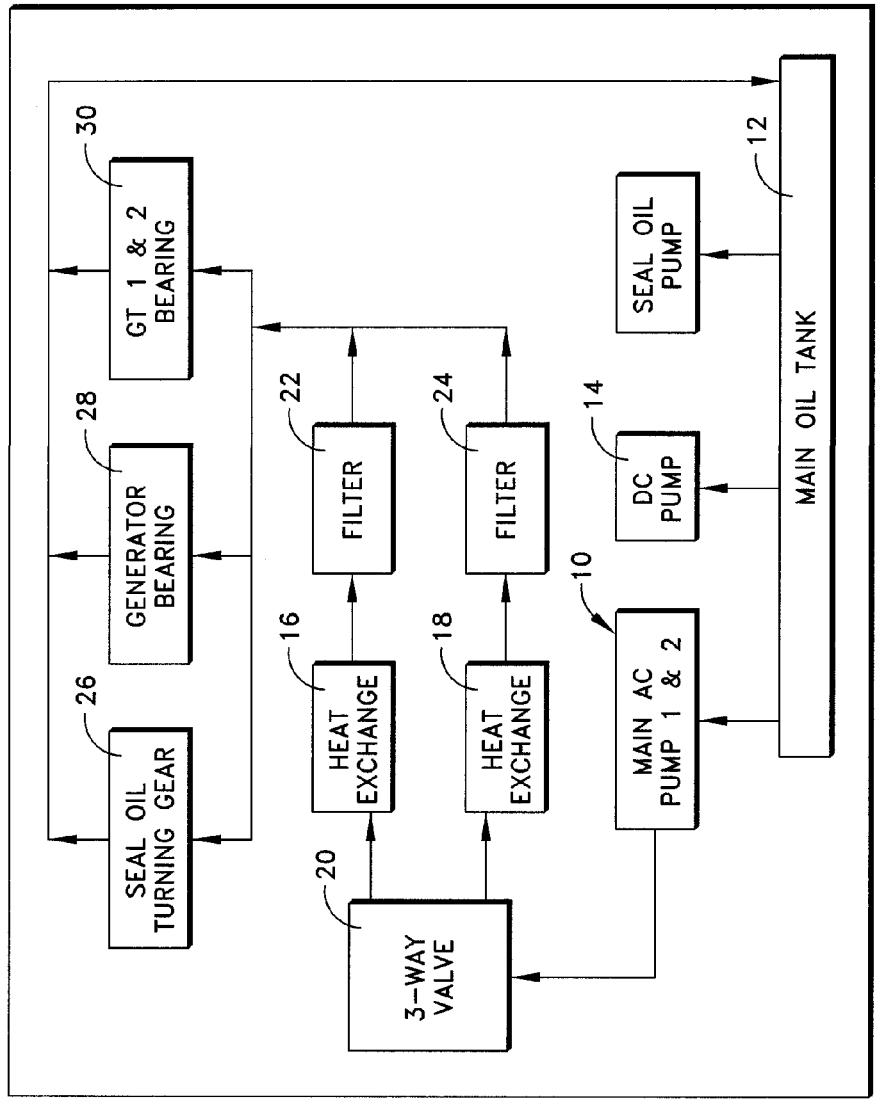
FIG. 1 is a schematic of a prior art lube oil circulating system.

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices. Moreover, certain terminology is used herein for convenience only and is not to be taken as a limitation on the present invention. Still further, in the drawings, the same reference numerals are employed for designating the same elements.

Referring now to the drawings, and, particularly to FIG. 1 an existing gas turbine lube oil schematic is illustrated. Lube oil is circulated by a redundant set of AC pumps 10 which pump the lubricating oil from a main oil tank 12. A DC pump 14 is provided in case AC power to the site is interrupted. AC pumps 10 and DC pump 14 are examples of means for pumping the relatively hot lubricating oil from the at least one lubrication site.

Relatively hot lubricating oil is pumped from the main oil tank 12 to one of a pair redundant oil-to-water heat exchanges 16 and 18 where the lubricating oil is cooled. The phase relatively hot is intended to be broadly construed and cover a large range of temperatures. In some respects the actual temperature of the oil in the tank 12 will be dependent upon the amount of heat imparted to the oil by turbine engine component(s) (e.g., gears and/or bearings 26-30). In general, the phrase relatively hot means that the temperature is greater than the temperature of the fuel by a difference enough to be usable to warm the fuel as discussed further below. One of the heat exchangers is in a stand-by condition and may be switched on-line by a three-way valve. After passing through a filter 22 or 24, the oil is delivered to a turning gear 26, a generator bearing 28, and turbine generator bearings 30. It should be appreciated that the gears and/or bearings 26-30 are example portion of turbine engine components. With the turbine and possible associated generator and mechanical drive being one example of a turbine engine component arrangement. After lubricating and absorbing heat from the rotating equipment, oil is returned to the main oil tank 12.

The oil-to-water heat exchangers 16 and 18 are typically provided with a coolant including about 25% ethylene glycol and 75% water, which circulates through the heat exchanger where heat is extracted by the coolant. The plant auxiliary cooling water system ultimately rejects waste heat extracted by the coolant to the atmosphere. Various sensing devices (not shown) are included in the lubricating system to ensure adequate oil level in the tank, oil pressure, and oil temperature.

Figure 2:
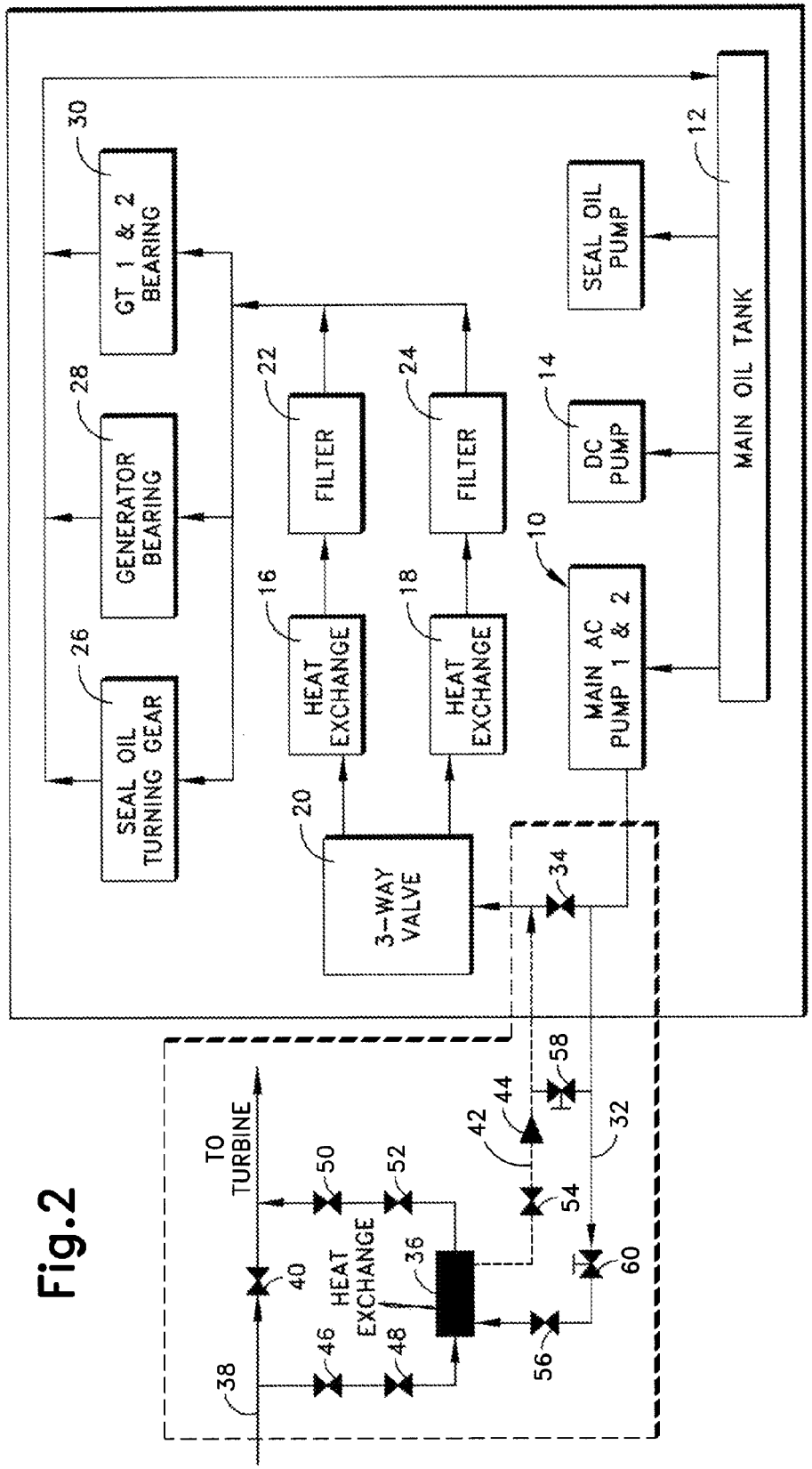
FIG. 2 is a schematic illustrating modifications to the prior art system according to one aspect of this invention.

Referring now to FIG. 2, the existing gas turbine lube oil system illustrated in FIG. 1 is shown as being modified by an arrangement according to one aspect of the present invention. Relatively hot lubricating oil is pumped from the main oil tank and is shunted by a line 32 and an isolation valve 34 to a double-wall or tube safety heat exchanger 36. Double-wall or tube heat exchangers are used where an intermixing of heat exchange media is to be avoided. Of course, the structure(s) for the exchange of heat may be varied. Heat is exchanged in the heat exchanger 36 with incoming, relatively cool, natural gas fuel for the turbine, which is shunted from an incoming fuel line 38 by an isolation valve 40. Heated fuel is delivered to the turbine while cooled lubricating oil is delivered to the lube oil system through a line 42 past a check valve 44. The lube oil then passes through the three way valve 20 to one of the heat exchangers 16 and 18 and then to the points to be lubricated. Thus, the heat exchanger 36 is one example of part of means for applying heat from the at least one heat generating source to relatively cold fuel for the turbine engine to preheat the fuel prior to ignition. The phase relatively cold is to be broadly construed and cover a large range of temperatures. In some respects the actual temperature of the fuel will be dependent upon ambient temperature of the fuel as stored and the temperature of the environment through which the incoming fuel line 38 extends. In general, the phrase relatively cold means that the temperature is lower than a desired temperature at which the fuel can be combusted to obtain the greatest power output and/or fuel economy from the turbine. Also, relatively cold is in relationship to the temperature of the oil so that the temperature of the fuel is greater than the relatively cold fuel by a difference enough to be usable to warm the fuel. It is to be appreciated that the example is contemplated not to limit the scope of the present invention.

In order to isolate the fuel gas and lubricating oil shunts from the existing system during routine maintenance or sensed failure of the heat exchanger 36, the isolation valves 34 and 40 are opened, isolation valves 46, 48, 50, 52, 54, 56 and regulator valves 58 and 60 are closed. With the circuit in this condition, fuel gas in the line 38 is fed directly to the turbine while the heat exchanger 36 is isolated and lubricating oil circulates directly from the pump 10 through one of the heat exchangers 16 and 18 to the sites to be lubricated. All of the described valves may be activated either electrically or pneumatically.

Figure 3:
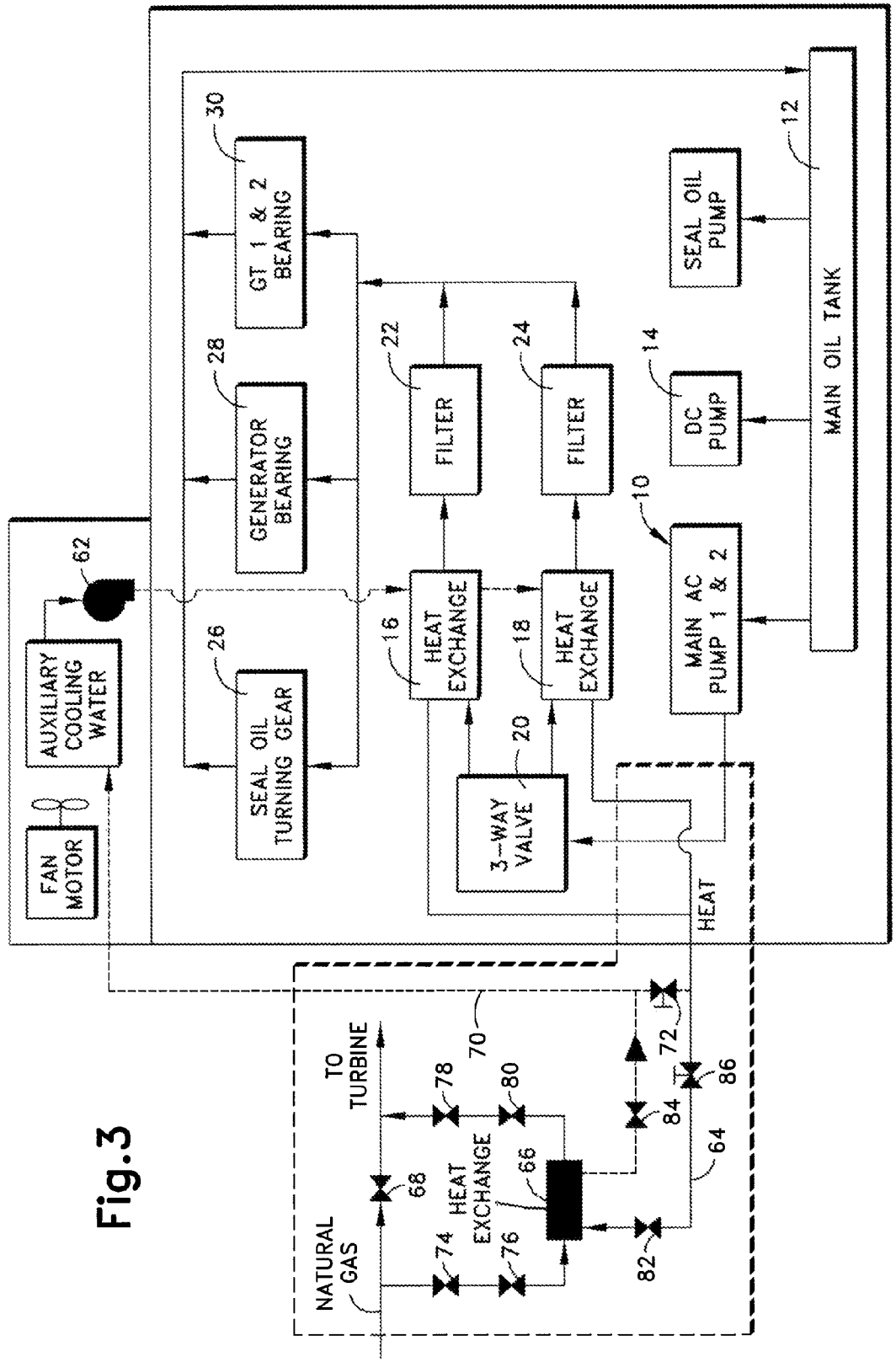
FIG. 3 is a schematic illustrating further modification to the prior art system according to a further aspect of this invention.

Referring now to FIG. 3, the existing gas turbine lube oil system illustrated in FIG. 1 is shown as being modified by an arrangement according to a further aspect of this invention. This arrangement takes waste heat from the lube oil auxiliary cooling water and uses it to preheat the relatively cool natural gas fuel.

Relatively cool auxiliary cooling water is pumped by a pump 62 to the heat exchangers 16 and 18 where it exchanges heat with hot lubricating oil from the main oil tank 12. Hot water is conducted from the heat exchanger 16 or 18 by a line 64 and exchanges heat in a double wall or tube heat exchanger 66 with incoming cool natural gas fuel shunted by an isolation valve 68. Heated fuel is delivered to the turbine while cooled water is returned through a line 70 to the auxiliary cooling water tank. Thus, the heat exchanger 66 is another example of part of means for applying heat from the at least one heat generating source to relatively cold fuel for the turbine engine to preheat the fuel prior to ignition. It is to be appreciated that the example is contemplated not to limit the scope of the present invention.

In order to isolate the fuel gas shunt from the cooling water circuit during routine maintenance or sensed failure of the heat exchanger 66, the isolation valve 68 and a closed regulator valve 72 are opened, and isolation valves 74, 76, 78, 80, 82, 84 are closed. With the circuit in this condition, fuel gas is fed through the valve 68 directly to the turbine, while the heat exchanger 36 is isolated by the closed isolation valves 74-84 and the regulator valve 86. The auxiliary cooling water is then fed through the heat exchangers 16 and 18 and returned to the auxiliary cooling water tank, through the opened valve 116.

Figure 4:
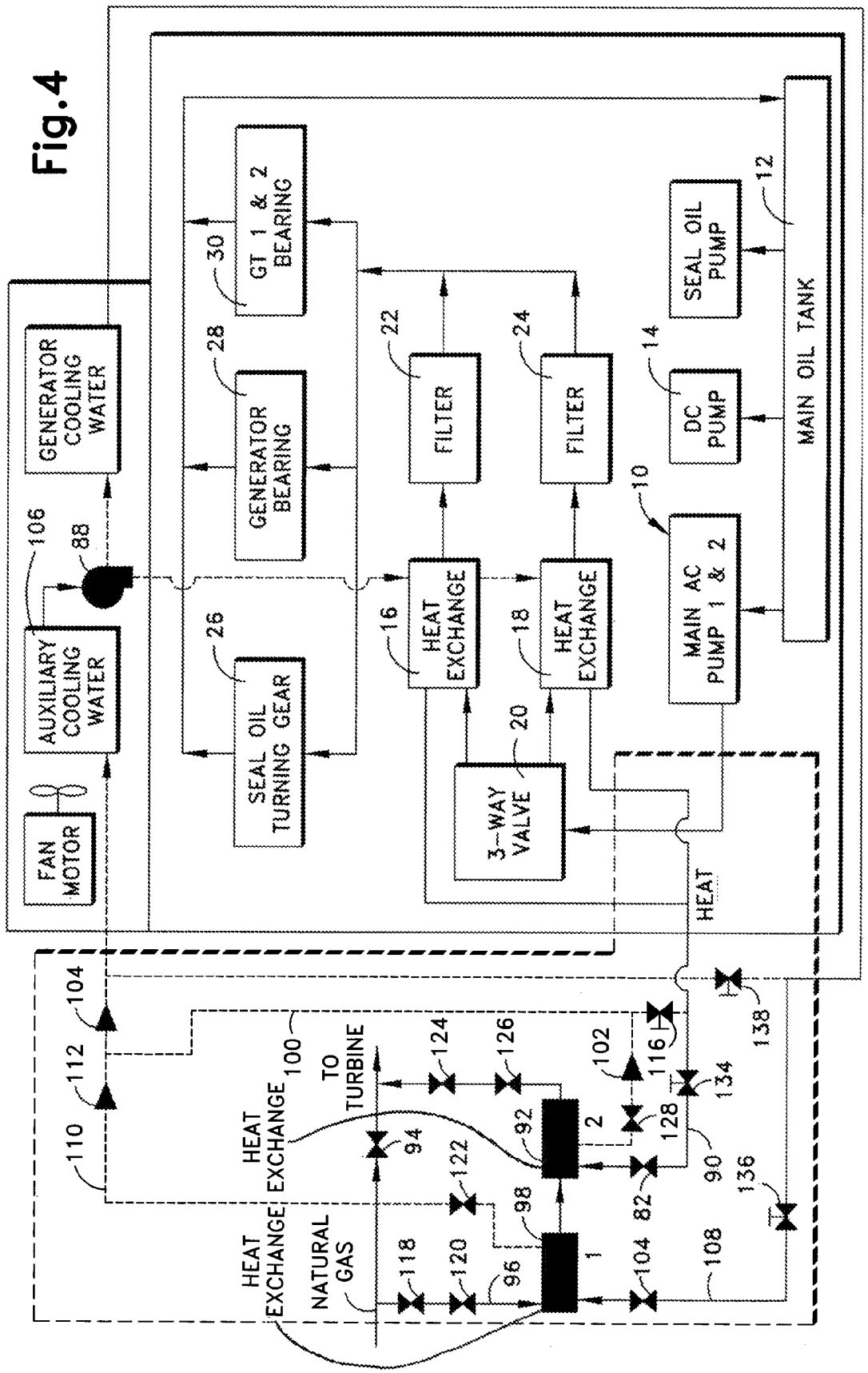
FIG. 4 is a schematic illustrating still further modifications to the prior art system according to a still further aspect of this invention.

Referring now to FIG. 4, the gas turbine lube oil system illustrated in FIG. 1 is shown as being modified by an arrangement according to a still further aspect of this invention. This arrangement takes waste heat from the lube oil auxiliary cooling water and uses it to preheat the relatively cool natural gas fuel. This arrangement also takes waste heat from the generator cooling water and uses it to further preheat the natural gas fuel.

Relatively cool auxiliary cooling water is pumped by a pump 88 to the heat exchangers 16 and 18 where it exchanges heat with hot lubricating oil from the main oil tank 12. Hot water is conducted from the heat exchangers 16 or 18 by a line 90 and exchanges heat in a double wall or tube heat exchanger 92 with incoming cool natural gas fuel shunted by an isolation valve 94. The relatively cool natural gas flows through a line 96 to a double wall or tube heat exchanger 98, to the heat exchanger 92 and then to the turbine. The cooled water flows through a line 100, past one way check valves 102 and 104 and back to an auxiliary cooling water tank 106.

Relatively cool auxiliary cooling water is pumped by the pump 88 to the generator where it is heated by the generator and pumped to the heat exchanger 98 and then to the heat exchanger 92 through a line 108. The relatively cool water is then returned to the auxiliary cooling water tank through a line 110 and through a one-way check valve 104. Thus, the heat exchangers 92 and 98 are yet another example of part of means for applying heat from the at least one heat generating source to relatively cold fuel for the turbine engine to preheat the fuel prior to ignition. It is to be appreciated that the example is contemplated not to limit the scope of the present invention.

In order to isolate the fuel gas shunt from the cooling water circuit during routine maintenance or sensed failure of one or both of the heat exchangers 98 and 92, the isolation valve 94 and closed regulator valve 116 and 138 are opened and isolation valves 118, 120, 124, 126, 128, 130, and 132 and regulator 134 and 136 are closed. With the circuit in this condition, fuel gas is fed through the valve 94 directly to the turbine, while the heat exchangers 92 and 98 are isolated. Water flowing from the heat exchangers 16 and 18 is blocked by the closed valve 134 and flows through the open valve 116, through the line 100, past the one-way check valve 104 and back to the auxiliary cooling water tank 106. Generator cooling water is blocked by the closed valve 136 and flows through opened valve 138 to the auxiliary cooling water tank 106.

From the above example structural embodiments, it will be appreciated that associated methods provide other aspects of the present invention. For example, in accordance with one other aspect the present invention provides a waste heat utilization method for preheating fuel for a turbine engine that powers a generator or a mechanical drive component. The method includes extracting heat from at least one heat generating source in the turbine engine and/or the generator and applying the heat to relatively cold fuel for the turbine engine to preheat the fuel prior to ignition. As a further example, in accordance with yet another aspect the present invention provides a method of providing a waste heat utilization system for preheating fuel for a turbine engine that powers a generator. The turbine engine and/or the generator include at least one heat generating source. The method includes providing means for applying heat from the at least one heat generating source to relatively cold fuel for the turbine engine to preheat the fuel prior to ignition. As a further example, in accordance with another application of present invention in the case of a combined-cycle gas turbine, where cold gas fuel is typically heated in a performance heater by hot feed water extracted from HRSG at an optimum point. Gas turbine fuel upon being heated by the waste heat utilization system can be introduced in to a performance heater for achieving additional energy savings prior to ignition in a combined-cycle combustion gas turbine.

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims.

What is claimed is:

1. A waste heat utilization system for preheating fuel for a turbine engine component, the component including at least two heat generating sources, the system including means for selectively applying heat from one or more of the at least two heat generating sources to relatively cold fuel for the turbine engine to preheat the fuel prior to ignition, and an isolation valve located on an incoming fuel line to shunt fuel from the incoming fuel line to the means for selectively applying heat, wherein the at least two heat generating sources each removes heat from a different moving part of the turbine engine component, further including at least one valve arrangement for selectively blocking flow of heat from the at least two heat generating sources from flowing through the means for selectively applying heat, wherein a first of the at least two heat generating sources includes hot lubricating oil from the turbine engine component and a second of the at least two heat generating sources includes heated auxiliary cooling water.

2. A system as set forth in claim 1, wherein the turbine engine component having at least one lubrication site, with lubricating oil being applied to the at least one lubrication site and becoming relatively hot thereat, the system including means for pumping the relatively hot lubricating oil from the at least one lubrication site.

3. A system as set forth in claim 1, wherein the auxiliary cooling water is heated by exchanging heat with hot lubricating oil from the turbine engine component.

4. A system as set forth in claim 1, wherein the means for selectively applying heat includes a heat exchanger.

5. A system as set forth in claim 4, wherein the heat exchanger is a double wall or tube heat exchanger.

6. A waste heat utilization method for preheating fuel for a turbine engine component including extracting heat from at least two heat generating sources in the turbine engine component and selectively applying, via means for selectively applying heat, the heat to relatively cold fuel for the turbine engine component to preheat the fuel prior to ignition, and utilizing an isolation valve located on an incoming fuel line to shunt fuel from the incoming fuel line to the means for selectively applying heat, wherein the at least two heat generating sources each removes heat from a different moving part of the turbine engine component, further including utilizing at least one valve arrangement for selectively blocking flow of heat from the at least two heat generating sources from flowing through the means for applying heat, wherein a first of the at least two heat generating sources includes hot lubricating oil from the turbine engine component and a second of the at least two heat generating sources includes heated auxiliary cooling water.

7. A method as set forth in claim 6, wherein the turbine engine component having at least one lubrication site, with lubricating oil being applied to the least one lubrication site and becoming relatively hot thereat, the method including pumping the relatively hot lubricating oil from the at least one lubrication site.

8. A method as set forth in claim 6, wherein the auxiliary cooling water is heated by exchanging heat with hot lubricating oil from the turbine engine component.

9. A method as set forth in claim 6, wherein the means for selectively applying heat includes a heat exchanger.

10. A method as set forth in claim 9, wherein the heat exchanger is a double wall or tube heat exchanger.

11. A method of providing a waste heat utilization system for preheating fuel for a turbine engine that powers a generator, the turbine engine and/or the generator including at least two heat generating sources, the method including providing means for selectively applying heat from one or more of the at least one heat generating sources to relatively cold fuel for the turbine engine to preheat the fuel prior to ignition, and providing an isolation valve located on an incoming fuel line to shunt fuel from the incoming fuel line to the means for selectively applying heat, wherein the at least two heat generating sources each removes heat from a different moving part of the turbine engine component, further including providing at least one valve arrangement for selectively blocking flow of heat from the at least two heat generating sources from flowing through the means for selectively applying heat, wherein a first of the at least two heat generating sources includes hot lubricating oil from the turbine engine component and a second of the at least two heat generating sources includes heated auxiliary cooling water.

12. A method as set forth in claim 11, wherein the auxiliary cooling water being heated by exchanging heat with hot lubricating oil from the turbine engine.

* * * * *